(12) United States Patent
Kurino

(10) Patent No.: US 11,513,291 B2
(45) Date of Patent: Nov. 29, 2022

(54) OPTICAL FIBER CLEAVING APPARATUS AND OPTICAL FIBER CLEAVING METHOD

(71) Applicant: SUMITOMO ELECTRIC OPTIFRONTIER CO., LTD., Yokohama (JP)

(72) Inventor: Shinsuke Kurino, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 17/280,612

(22) PCT Filed: Aug. 26, 2019

(86) PCT No.: PCT/JP2019/033229
§ 371 (c)(1),
(2) Date: Mar. 26, 2021

(87) PCT Pub. No.: WO2020/066407
PCT Pub. Date: Apr. 2, 2020

(65) Prior Publication Data
US 2022/0043213 A1 Feb. 10, 2022

(30) Foreign Application Priority Data
Sep. 27, 2018 (JP) .............................. JP2018-181495

(51) Int. Cl.
*G02B 6/25* (2006.01)
(52) U.S. Cl.
CPC ..................................... *G02B 6/25* (2013.01)

(58) Field of Classification Search
CPC ....................................................... G02B 6/25
See application file for complete search history.

(56) References Cited

U.S. PATENT DOCUMENTS

| 6,634,079 | B1 | 10/2003 | Kazama | |
| 7,809,231 | B2* | 10/2010 | Pracklein | G02B 6/25 385/134 |
| 2005/0169594 | A1* | 8/2005 | Song | G02B 6/25 385/134 |
| 2006/0263028 | A1 | 11/2006 | Honma | |
| 2013/0098215 | A1* | 4/2013 | Ishihara | B26D 7/1836 83/156 |

(Continued)

FOREIGN PATENT DOCUMENTS

| EP | 1031857 A1 | 8/2000 |
| EP | 3546996 A1 | 10/2019 |

(Continued)

*Primary Examiner* — Evan H MacFarlane
*Assistant Examiner* — Liang Dong
(74) *Attorney, Agent, or Firm* — Oliff PLC

(57) ABSTRACT

An optical fiber cleaving apparatus includes: a main body on which an optical fiber having a predetermined length of a glass fiber portion exposed at a tip is placed; a cover member which fixes the optical fiber between the cover member and the main body; a blade member which scratches the glass fiber portion of the fixed optical fiber; and a breaking member which breaks the glass fiber portion at the scratched portion. The optical fiber cleaving apparatus further includes a retreat member which moves a broken end portion of the optical fiber to a position that does not contact with the blade member.

7 Claims, 11 Drawing Sheets

(56) References Cited

U.S. PATENT DOCUMENTS

| | | | | |
|---|---|---|---|---|
| 2015/0128779 A1* | 5/2015 | Zhao | ................... | B26D 1/151 83/375 |
| 2017/0235050 A1* | 8/2017 | Kurino | ................... | G02B 6/25 83/887 |
| 2017/0235051 A1 | 8/2017 | Kurino et al. | | |
| 2019/0339453 A1 | 11/2019 | Matsuda et al. | | |

FOREIGN PATENT DOCUMENTS

| | | |
|---|---|---|
| JP | S62-087902 A | 4/1987 |
| JP | S62-218908 A | 9/1987 |
| JP | 05-080219 A | 4/1993 |
| JP | 06-082637 A | 3/1994 |
| JP | 2000-089035 A | 3/2000 |
| JP | 2007-047812 A | 2/2007 |
| JP | 2011-131360 A | 7/2011 |
| JP | 2017-142458 A | 8/2017 |
| WO | 2018/097094 A1 | 5/2018 |

\* cited by examiner

OPTICAL FIBER CLEAVING APPARATUS AND OPTICAL FIBER CLEAVING METHOD

TECHNICAL FIELD

The present disclosure relates to an optical fiber cleaving apparatus and an optical fiber cleaving method.

This application claims priority based on Japanese Patent Application No. 2018-181495 filed on Sep. 27, 2018, the contents of which are incorporated herein by reference in its entirety.

BACKGROUND ART

Patent Literature 1 discloses an optical fiber cleaving apparatus including a blade capable of scratching an outer peripheral surface of an optical fiber and a pusher for pushing the optical fiber to break at a scratched portion. The optical fiber cleaving apparatus includes a reverse-running prevention mechanism that prevents the blade which scratched the optical fiber from being moved in the reverse direction and scratching the optical fiber again.

Patent Literature 2 discloses an optical fiber cleaving apparatus in which an optical fiber is fixed by a pair of clamps and then the optical fiber is pressed against a cleaving blade provided between the pair of clamps by an optical fiber pressing member to be cleaved. In the optical fiber cleaving apparatus, the cleaving blade is press-fitted and fixed to be embedded in the cleaving blade mounting groove formed in the blade base and only the cleaving edge portion of the cleaving blade is protruded from the blade base. The blade base includes a receiving portion for receiving the cleaved end portion of the optical fiber after cleaving.

CITATION LIST

Patent Literature

Patent Literature 1: JP-A-2000-089035
Patent Literature 2: JP-A-2011-131360

SUMMARY OF INVENTION

Solution to Problem

In order to achieve an object of the present disclosure, an optical fiber cleaving apparatus of the present disclosure includes a main body on which an optical fiber having a predetermined length of a glass fiber portion exposed at a tip is placed, a cover member which fixes the optical fiber between the cover member and the main body, a blade member which scratches the fixed glass fiber portion, a breaking member for breaking the glass fiber portion at the scratched portion, and a retreat member which moves a broken end portion of the optical fiber to a position that does not contact with the blade member.

In order to achieve an object of the present disclosure, an optical fiber cleaving method of the present disclosure includes a step of fixing an optical fiber having a predetermined length of a glass fiber portion exposed at a tip, a step of scratching the fixed glass fiber portion with a blade member, a step of breaking the glass fiber portion at the scratched portion, and a step of moving a broken end portion of the optical fiber to a position that does not contact with the blade member.

BRIEF DESCRIPTION OF DRAWINGS

FIG. 4 is a schematic view showing a retreat member included in the optical fiber cleaving apparatus, together with a blade member, a holding member, and the like.

DESCRIPTION OF EMBODIMENTS

Technical Problem

Figure 1:
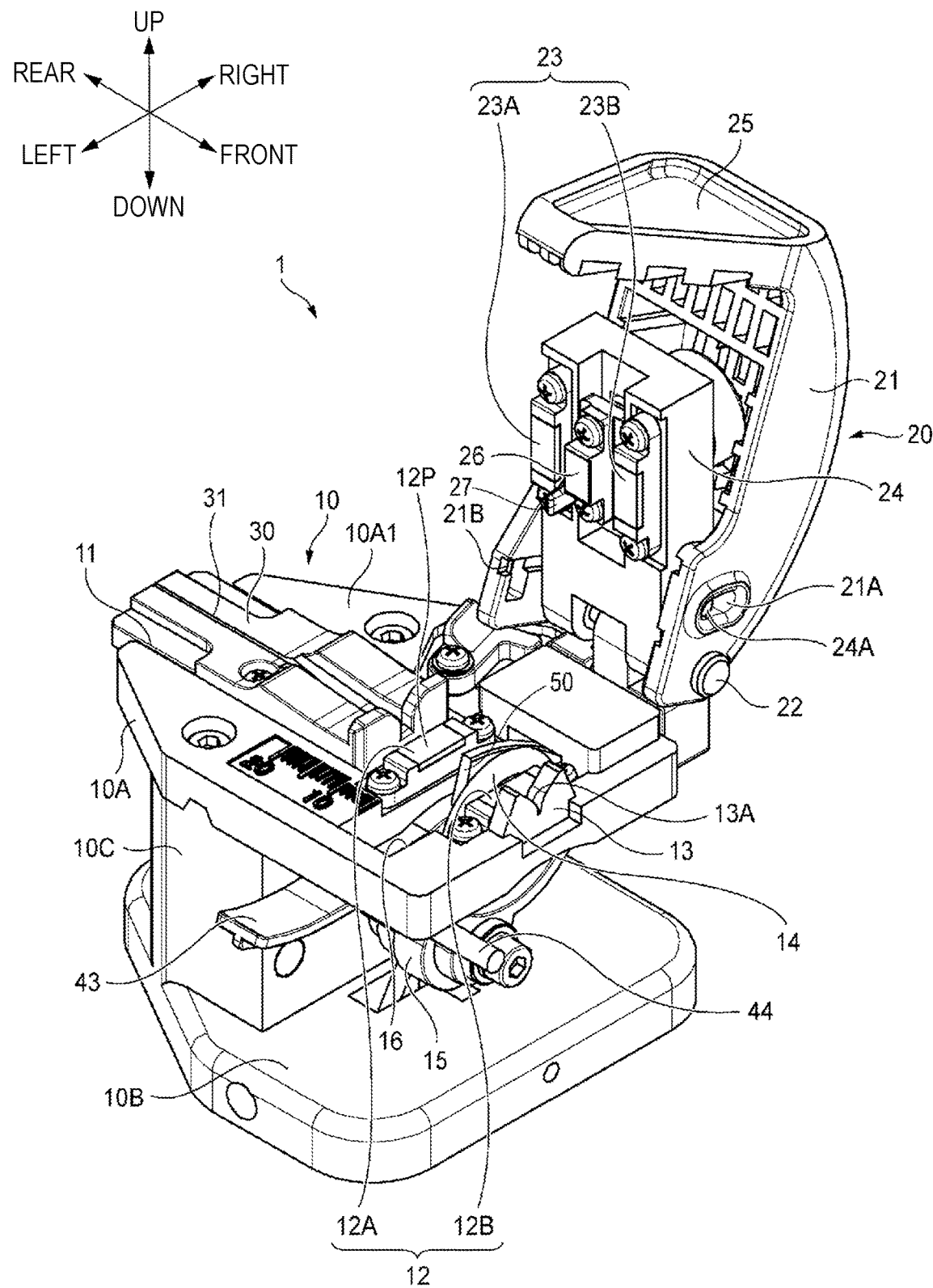
FIG. 1 is a front perspective view showing an optical fiber cleaving apparatus according to an embodiment of the present application.

The reverse-running prevention mechanism of Patent Literature 1 has a complicated structure, and a separate step is required to stop the reverse-running prevention function in order to start cleaving the next optical fiber.

In the optical fiber cleaving apparatus of Patent Literature 2, although the process after the optical fiber cleavage is not disclosed, when the optical fiber pressing member is retreated, there is a possibility that the cleaved end portion of the optical fiber may come into contact with the cleaving blade again and the cleaved end portion may be cleaved again.

Therefore, an object of the present disclosure is to provide an optical fiber cleaving apparatus and an optical fiber cleaving method, capable of preventing scratch in, or in the vicinity of, a broken end surface of the optical fiber after the optical fiber is cleaved, with a simple configuration.

Advantageous Effects of Invention

According to the present disclosure, it is possible to provide an optical fiber cleaving apparatus and an optical fiber cleaving method, capable of preventing scratch in, or in the vicinity of, a cleaved end surface of the optical fiber after the optical fiber is cleaved, with a simple configuration.

DESCRIPTION OF EMBODIMENTS OF THE PRESENT DISCLOSURE

First, the contents of the embodiments of the present disclosure will be listed and described.

An optical fiber cleaving apparatus according to an embodiment of the present disclosure includes:

(1) a main body on which an optical fiber having a predetermined length of a glass fiber portion exposed at a tip is placed, a cover member which fixes the optical fiber between the cover member and the main body, a blade member which scratches the fixed glass fiber portion, a breaking member for breaking the glass fiber portion at the scratched portion, and a retreat member which moves a broken end portion of the optical fiber to a position that does not contact with the blade member.

According to the configuration of the present disclosure, the retreat member can be used to move the broken end portion of the optical fiber to a position that does not contact with the blade member after the optical fiber is scratched. Therefore, with a simple configuration, it is possible to prevent the broken end portion (broken end surface or its vicinity) of the optical fiber from being scratched after cleaving of the optical fiber.

(2) The retreat member may be interlocked with the movement of the blade member and move the broken end portion.

According to the configuration of the present disclosure, the retreat member can be moved in a series of work steps from the completion of cleaving the optical fiber to the start of cleaving the next optical fiber.

(3) The retreat member may be interlocked with the movement of the cover member and move the broken end portion.

According to the configuration of the present disclosure, the retreat member can be moved in a series of work steps from the completion of cleaving the optical fiber to the start of cleaving the next optical fiber.

(4) The blade member may be moved along a circular arc.

According to the configuration of the present disclosure, the optical fiber can be retreated from the blade member that is moved along the circular arc.

(5) The blade member may be disposed to pass through at least a portion of a region where the glass fiber portion of the optical fiber are disposed, and the retreat member may move the broken end portion to a position farther from a center of the circular arc than the region through which the blade member moved along the circular arc is passed.

According to the configuration of the present disclosure, the optical fiber can be easily retreated from the blade member that is moved along the circular arc.

(6) The blade member may be moved along a straight line.

According to the configuration of the present disclosure, the optical fiber can be retreated from the blade member that is moved along a straight line.

(7) The optical fiber cleaving apparatus further includes a holding member that is movably attached to the main body and holds the blade member, in which the retreat member is attached to the holding member, in which an urging member for urging the retreat member is provided between the retreat member and the holding member, in which the retreat member, when pressed by the cover member, is moved to a position that does not contact with the optical fiber fixed between the main body and the cover member, and in which the retreat member is urged by the urging member to move the optical fiber, which is not fixed between the main body and the cover member, to a position that does not contact with the blade member.

According to the configuration of the present disclosure, it is possible to easily realize a configuration in which the retreat member does not interfere with the movement of the blade member when the blade member scratches the optical fiber, and the retreat member can retreat the optical fiber from the moving path of the blade member after the optical fiber is broken.

(8) The retreat member may move the optical fiber in a direction intersecting a central axis in a longitudinal direction thereof, to move the broken end portion to a position that does not contact with the blade member.

According to the configuration of the present disclosure, with a simple configuration, the optical fiber can be retreated from the moving path of the blade member after cleaving of the optical fiber.

(9) The retreat member may move the optical fiber along a central axis in a longitudinal direction thereof, to move the broken end portion to a position that does not contact with the blade member.

According to the configuration of the present disclosure, with a simple configuration, the optical fiber can be retreated from the moving path of the blade member after cleaving of the optical fiber.

(10) Furthermore, an optical fiber cleaving method according to the embodiment of the present disclosure includes a step of fixing an optical fiber having a predetermined length of a glass fiber portion exposed at a tip, a step of scratching the fixed glass fiber portion with a blade member, a step of breaking the glass fiber portion at the scratched portion, and a step of moving a broken end portion of the optical fiber to a position that does not contact with the blade member.

According to the method of the present disclosure, the retreat member can be used to move the broken end portion of the optical fiber to a position that does not contact with the blade member after the optical fiber is scratched. Therefore, with a simple configuration, it is possible to prevent the broken end portion (broken end surface or its vicinity) of the optical fiber from being scratched after cleaving of the optical fiber.

(11) At the step of fixing the optical fiber, the retreat member may be disposed at a position that does not contact with the optical fiber, and at the step of moving the broken end portion, the retreat member may be moved to contact with the optical fiber and the broken end portion may be moved to a position that does not contact with the blade member.

According to the method of the present disclosure, it is possible to easily realize a configuration in which the retreat member does not interfere with the movement of the blade member when the blade member scratches the optical fiber, and the retreat member can retreat the optical fiber from the moving path of the blade member after the optical fiber is broken.

DETAILED DESCRIPTION OF EMBODIMENTS OF THE PRESENT DISCLOSURE

Hereinafter, preferred embodiments of the present disclosure will be described in detail with reference to the accompanying drawings. In the description of the drawings, the same or equivalent elements are designated by the same reference numerals, and duplicate description will be omitted.

Figure 2:
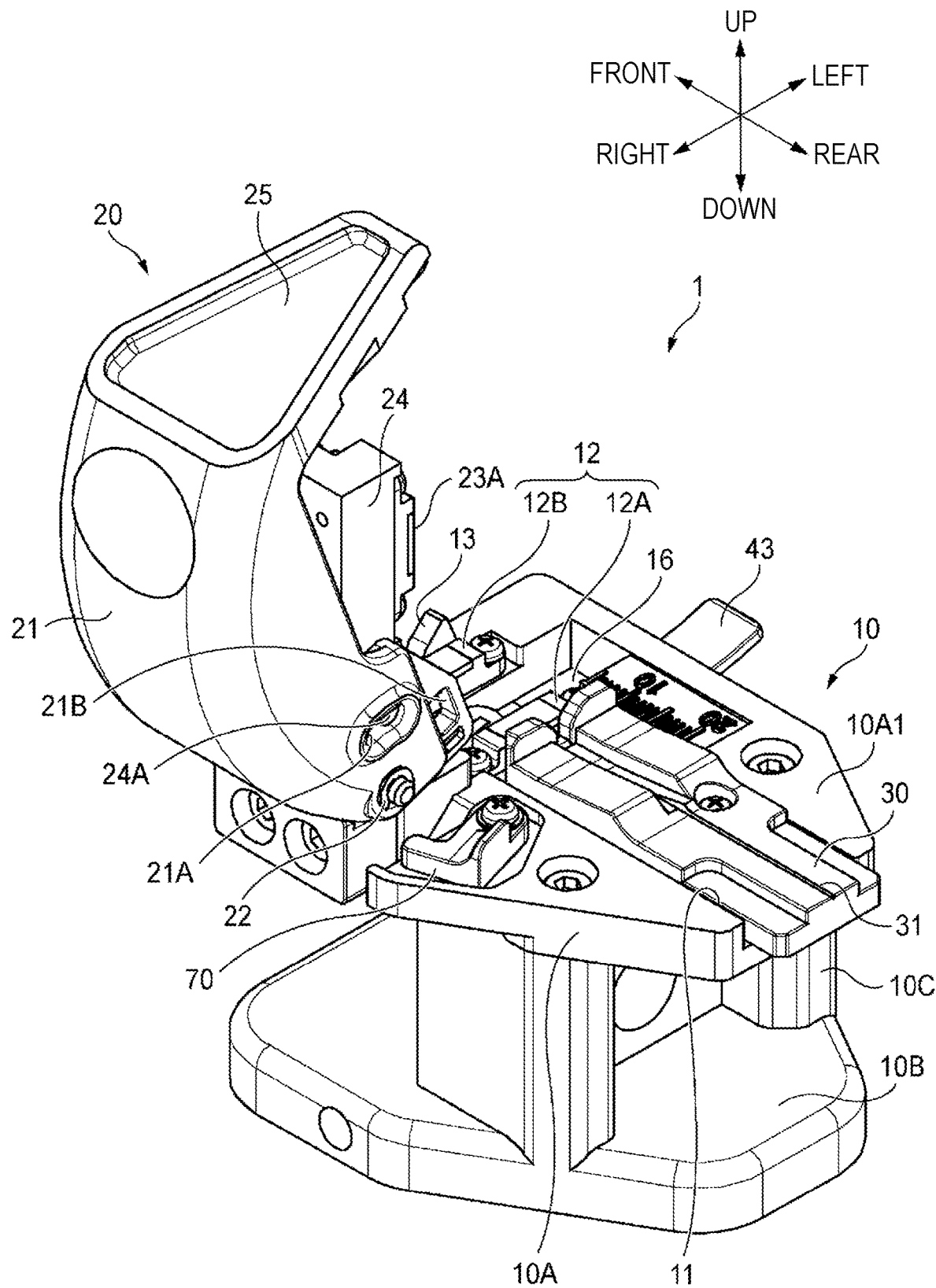
FIG. 2 is a rear perspective view showing the optical fiber cleaving apparatus of FIG. 1.
Figure 3:
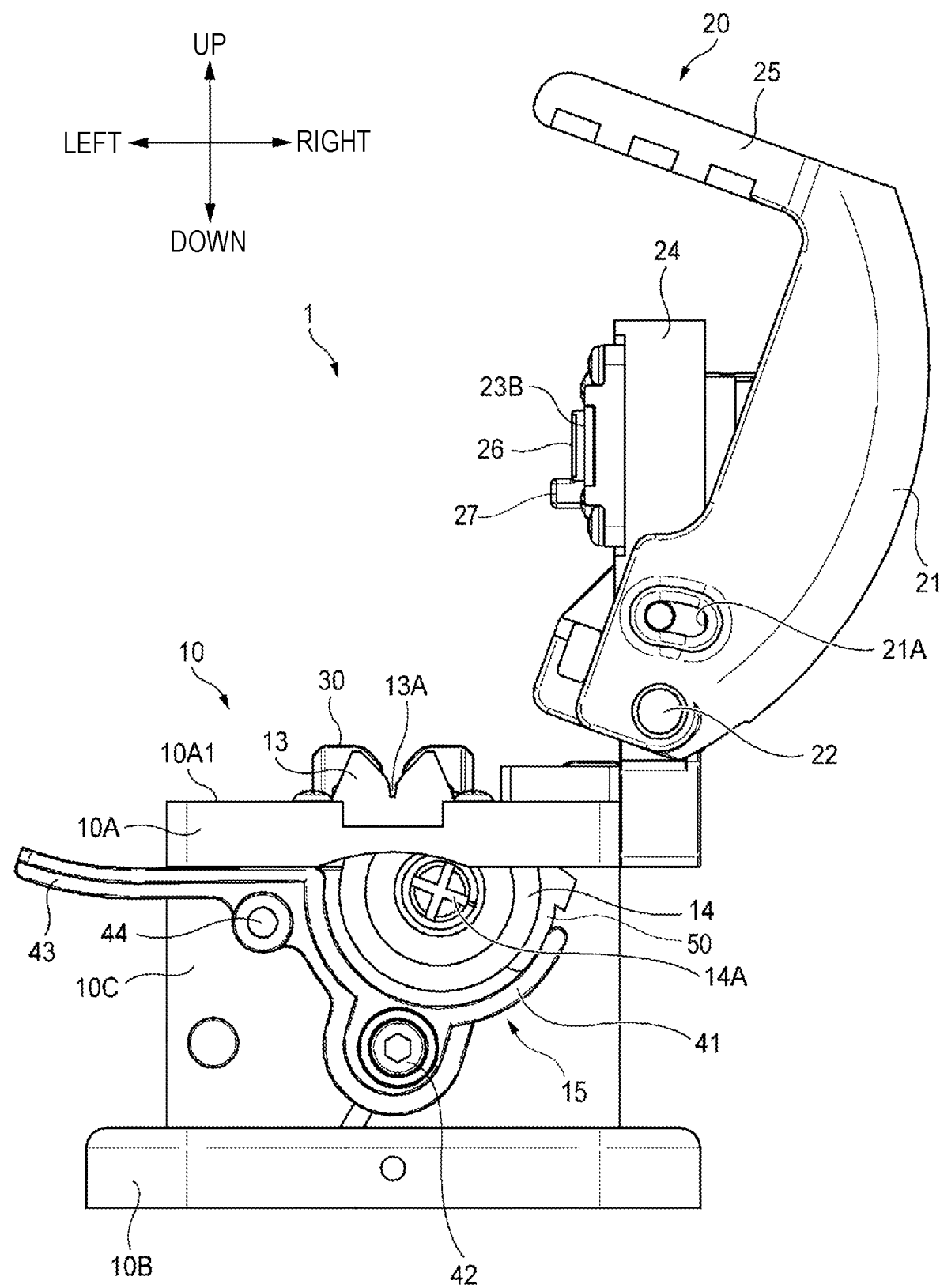
FIG. 3 is a front view showing the optical fiber cleaving apparatus of FIG. 1.

FIGS. 1 and 2 are a front perspective view and a rear perspective view showing an optical fiber cleaving apparatus and a holder attached thereto according to an embodiment of the present disclosure. FIG. 3 is a front view showing the optical fiber cleaving apparatus.

An optical fiber cleaving apparatus 1 includes a main body 10 and a clamp cover 20. The main body 10 includes a holder fixing part 11, a lower fixing member 12, a fiber positioning part 13, a blade member 14, a holding member 15, and a retreat member 50. The clamp cover 20 includes an arm member 21, a rotary member 22, an upper fixing member 23, a mounting member 24, a lever pressing part 25, and a breaking member 26. A clamp part for clamping the glass fiber portion of the optical fiber 100 (see FIG. 4) is configured by the lower fixing member 12 of the main body 10 and the upper fixing member 23 of the clamp cover 20.

The main body 10 further includes a top plate 10A, a bottom plate 10B, and a pillar 10C connecting the top plate 10A and the bottom plate 10B. The holder fixing part 11 is provided on an upper surface 10A1 of the top plate 10A. The holder fixing part 11 is a portion formed in a concave shape for fixing the holder 30 that holds the optical fiber 100 at the protective coating portion of the optical fiber. As an example, the holder 30 has a structure in which a fiber storing groove 31 capable of storing a plurality of types of optical fibers having different outer diameters is provided on an upper surface thereof.

The lower fixing member 12 is fixed at a position facing the clamp cover 20 on the upper surface 10A1 of the top plate 10A. The lower fixing member 12 includes a pair of lower clamp parts 12A and 12B disposed at regular intervals. The lower clamp parts 12A and 12B are formed by fitting a rubber material on an upper surface of a metal base. Each of the lower clamp parts 12A and 12B is configured so that the glass fiber portion of the optical fiber 100 is placed on the upper surface of the rubber material (hereinafter referred to as a clamp surface 12P). The pair of lower clamp parts 12A and 12B face a pair of upper fixing members 23 which will be described below, and can pinch and fix the glass fiber portion of the optical fiber 100 upon closing of the clamp cover 20.

The lower clamp part 12B of the lower fixing member 12, which is disposed opposite to the holder fixing part 11, is provided with the fiber positioning part 13 on the outer side. The fiber positioning part 13 is a member protruding upward from the upper surface 10A1 of the top plate 10A. A guide groove 13A for storing the glass fiber portion of the optical fiber 100 is provided at a central portion of the fiber positioning part 13. At the tip of the optical fiber 100, a glass fiber portion of a predetermined length is exposed. The protective coating portion of the optical fiber 100 is stored in the fiber storing groove 31 of the holder 30, the exposed glass fiber portion is placed on the lower clamp parts 12A and 12B, and then the tip side of the glass fiber portion is stored in the guide groove 13A of the fiber positioning part 13. As a result, the optical fiber 100 is disposed at an appropriate position on the top plate 10A.

An exposed hole 16 is formed between the pair of lower clamp parts 12A and 12B. The blade member 14 protrudes upward from the exposed hole 16. The blade member 14 is formed of a blade formed around a disk. As shown in FIG. 3, a support shaft 14A is provided at the center of the blade member 14.

The holding member 15 is a member that holds the blade member 14 via the support shaft 14A. The holding member 15 includes a blade holding part 41, a rotary shaft 42, a rotary lever 43, and a round bar 44 made of metal. The support shaft 14A of the blade member 14 is attached to the blade holding part 41 of the holding member 15. The holding member 15 is attached to the pillar 10C of the main body 10 by the rotary shaft 42. The rotary lever 43 is provided to protrude laterally from the blade holding part 41. The holding member 15 is configured such that, by the rotary lever 43 moving up and down, the holding member 15 is rotatable about the rotary shaft 42 with respect to the pillar 10C of the main body 10. Therefore, by the movement of the rotary lever 43, the blade member 14 attached to the blade holding part 41 is moved (circularly moved) along a circular arc about the rotary shaft 42. The round bar 44 is provided such that the round bar 44 is extended from the rotary lever 43 along the longitudinal direction of the optical fiber 100 held by the holder 30, in the region of the rotary lever 43 on the blade holding part 41 side.

Figure 4:
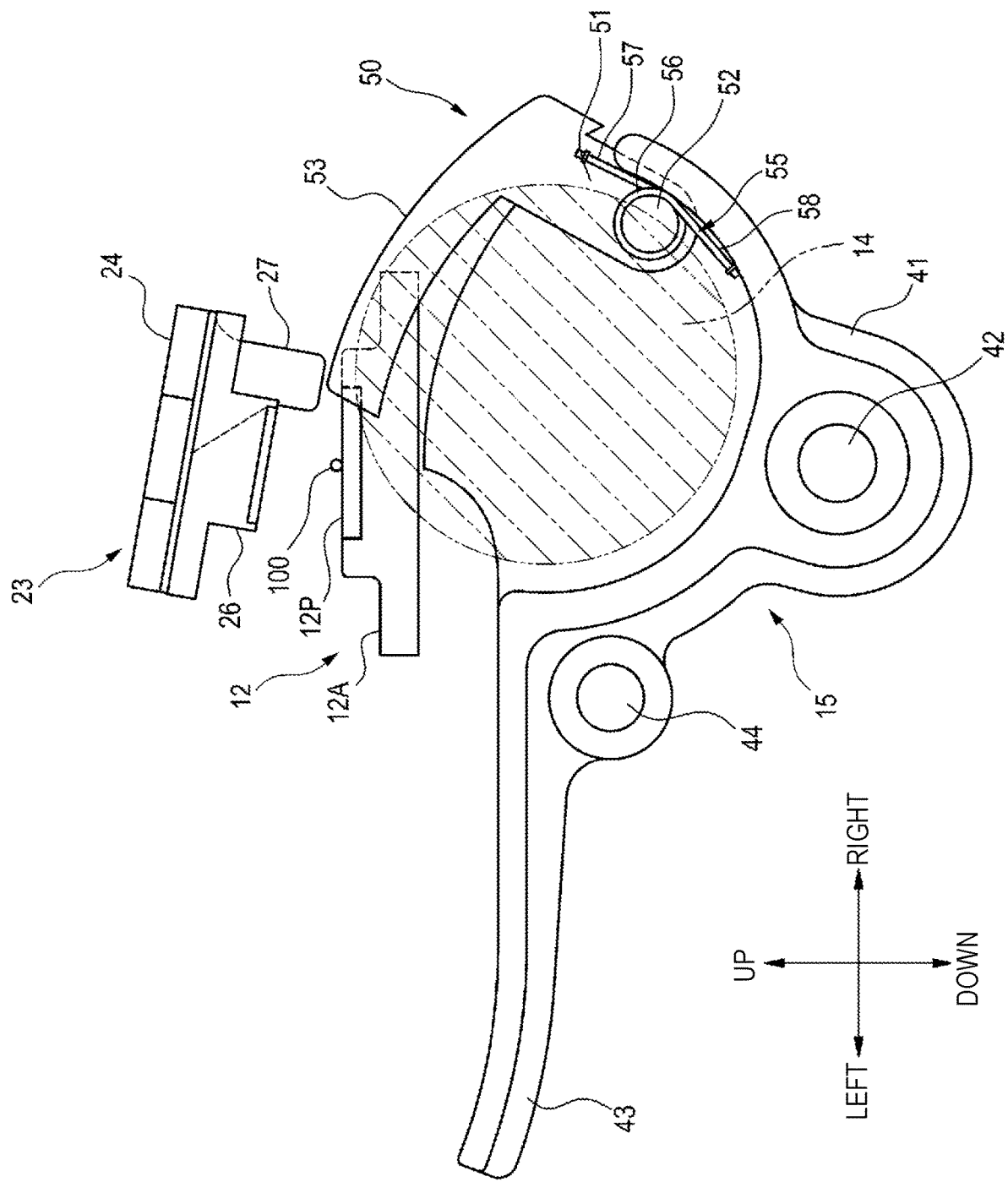

FIG. 4 is a schematic view showing the retreat member 50, together with the blade member 14, the holding member 15, and the upper and lower fixing members 12 and 23.

As shown in FIG. 4, the retreat member 50 is attached to the blade holding part 41 of the holding member 15, on a rear surface side of the blade member 14. The retreat member 50 includes a bearing 51 including a rotating shaft 52 and an arm 53. For example, the rotating shaft 52 is provided in the vicinity of a right end of the blade holding part 41. The arm 53 is extended from an upper end of the bearing 51 to the left direction and is formed in the shape of an upwardly-protruding arc. As a result, the arm 53 is rotatable about the rotating shaft 52 with respect to the blade holding part 41.

A torsion spring 55 (an example of an urging member) is provided between the retreat member 50 and the blade holding part 41. The torsion spring 55, which is also called a torsion coil spring, includes a coil part 56, a first arm 57 protruding from one end of the coil part 56, and a second arm 58 protruding from the other end of the coil part 56. The coil part 56 is fitted onto the rotating shaft 52 of the retreat member 50. The first arm 57 is fixed to the bearing 51 of the retreat member 50, and the second arm 58 is fixed to the blade holding part 41. As a result, the torsion spring 55 urges the rotating shaft 52 in a direction of lifting an end of the arm 53 (the left end of the arm 53 in FIG. 4) which is opposite to the end (the right end of the arm 53 in FIG. 4) connected to the bearing 51. That is, the torsion spring 55 urges the rotating shaft 52 in a clockwise direction. Due to the urging force of the torsion spring 55 as described above, in the state shown in FIG. 4 (initial state), an upper surface of the arm 53 protrudes slightly upward from an upper edge of the blade member 14. By pressing the arm 53 urged as described above with a protrusion part 27 (to be described below) provided on the clamp cover 20, the arm 53 can be moved downward against the urging force of the torsion spring 55. As described above, the arm 53 of the retreat member 50 is configured so that the relative position with respect to the blade holding part 41 can be changed according to the movement of the clamp cover 20.

The clamp cover 20 includes the elongated arm member 21. The arm member 21 is provided to cover a region in which the lower fixing member 12, the fiber positioning part 13, and the blade member 14 are disposed in the top plate 10A of the main body 10. The arm member 21 is rotatably connected to the main body 10 via the rotary member 22.

On a back surface side of the arm member 21, the upper fixing member 23 is disposed at a position facing the lower fixing member 12. The upper fixing member 23 includes a pair of upper clamp parts 23A and 23B disposed at regular intervals. The pair of upper clamp parts 23A and 23B are attached to the mounting member 24. The mounting member 24 is rotatably connected to the top plate 10A and the arm member 21 via the rotary member 22. The mounting member 24 includes a protrusion part 24A that is inserted into an elongated hole 21A provided in the arm member 21. A compression spring (not shown) is provided between the back surface of the arm member 21 and the upper fixing member 23. Therefore, the upper fixing member 23 is slidable with respect to the arm member 21 in the longitudinal direction of the elongated hole 21A.

The lever pressing part 25 is, at the side opposite to a portion where the rotary member 22 of the arm member 21 is provided, provided such that the lever pressing part 25 protrudes from the arm member 21 at a substantially right angle toward the main body 10 side in a state where the arm member 21 closes. The lever pressing part 25 is formed in a trapezoidal (inverted triangular) shape having a wide upper base so that the rotary lever 43 of the holding member 15 can be pressed downward when the arm member 21 is rotated to be closed. When the clamp cover 20 closes the main body 10, the rotary lever 43 is pressed downward by the lever pressing part 25, and the blade member 14 is moved along the circular arc. That is, the blade member 14 performs the circular arc movement. When the blade member 14 performs the circular arc movement, the glass fiber portion of the optical fiber 100 fixed by the upper and lower fixing members 12 and 23 can be scratched.

Between the upper clamp parts 23A and 23B, a breaking member 26 is provided so that the scratch made on the glass fiber portion by the blade member 14 is propagated to cause the glass fiber portion to break. The breaking member 26 is a member fixed to the mounting member 24, and is disposed to protrude slightly downward from the lower surfaces of the upper clamp parts 23A and 23B. Therefore, the glass fiber portion scribed (scratched) by the blade member 14 moving along the circular arc based on the downward movement of the rotary lever 43 can be pressed such that the scratch can be propagated to breakage. As an example, the breaking member 26 is formed by fitting a rubber material on the upper surface of a metal table. By the breaking member 26 propagating the scratch and causing breakage, it is ensured that the glass fiber portion can break at the portion scratched by the blade member 14 and a good broken end surface can be formed.

At one end of the breaking member 26, the protrusion part 27 protruding to the opposite side of the mounting member 24 is provided. The protrusion part 27 is disposed such that the protrusion part 27 comes into contact with the arm 53 of the retreat member 50 rotatably attached to the blade holding part 41 when the clamp cover 20 closes the main body 10. As a result, the arm 53 is moved downward by the protrusion part 27 against the urging force of the torsion spring 55 as the clamp cover 20 closes the main body 10.

The main body 10 and the clamp cover 20 are urged in a direction of opening each other by a spring member (not shown) provided between the arm member 21 and the mounting member 24. The angle (opening) formed by the top plate 10A of the main body 10 and the clamp cover 20 in open state is set to about 90 degrees, for example. As a result, when the hand releases the clamp cover 20 after the cleaving work is completed, the clamp cover 20 is automatically opened by means of the urging force of the spring member. Then, since the main body 10 and the clamp cover 20 can be held in the open state under the urging force of the spring member, the holder 30 can be easily attached to the holder fixing part 11. After the glass fiber portion is cleaved, the optical fiber 100 can be easily detached from the holder 30.

Figure 5:
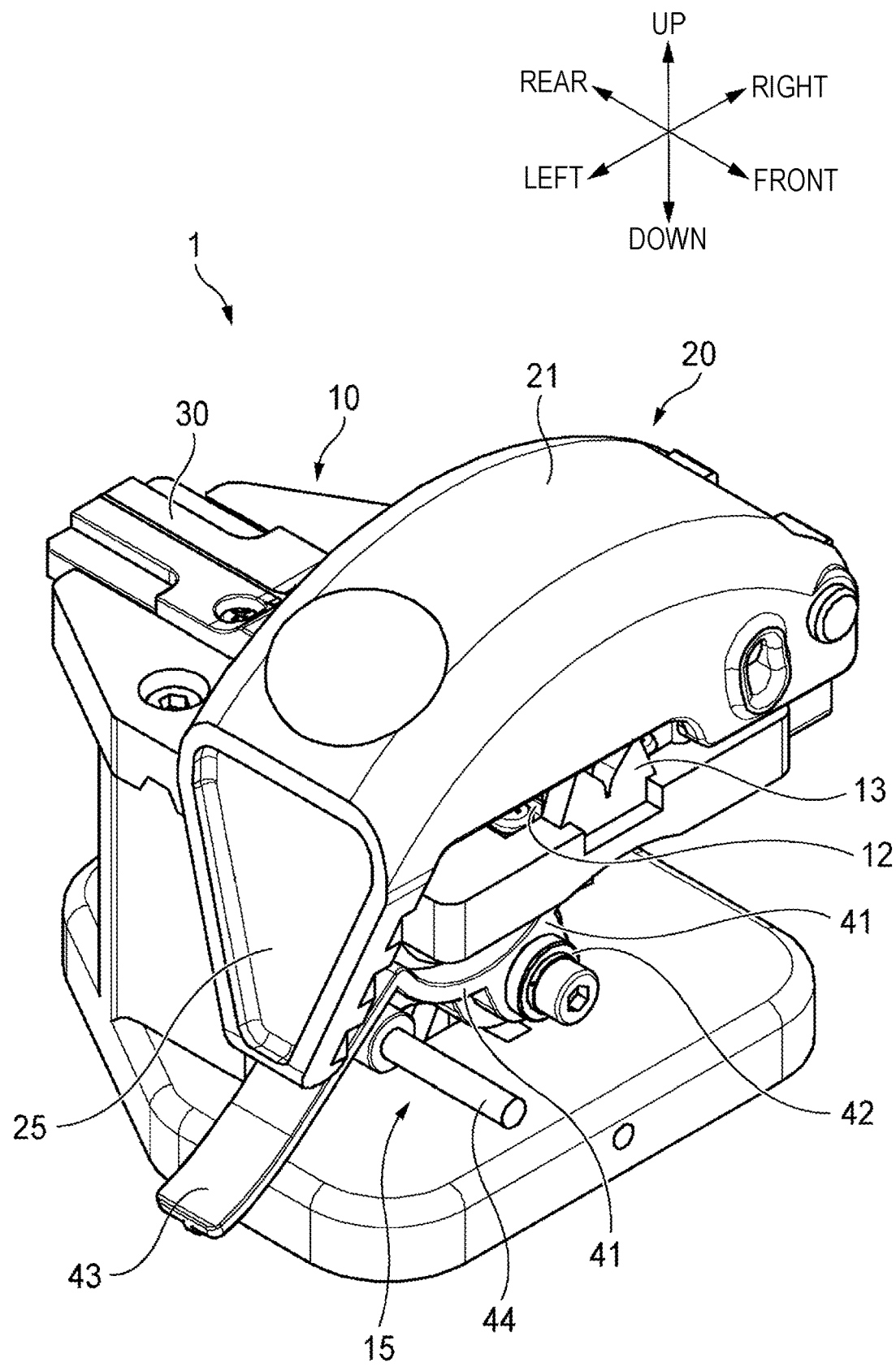
FIG. 5 is a front perspective view showing the optical fiber cleaving apparatus with the clamp cover closed.
Figure 6:
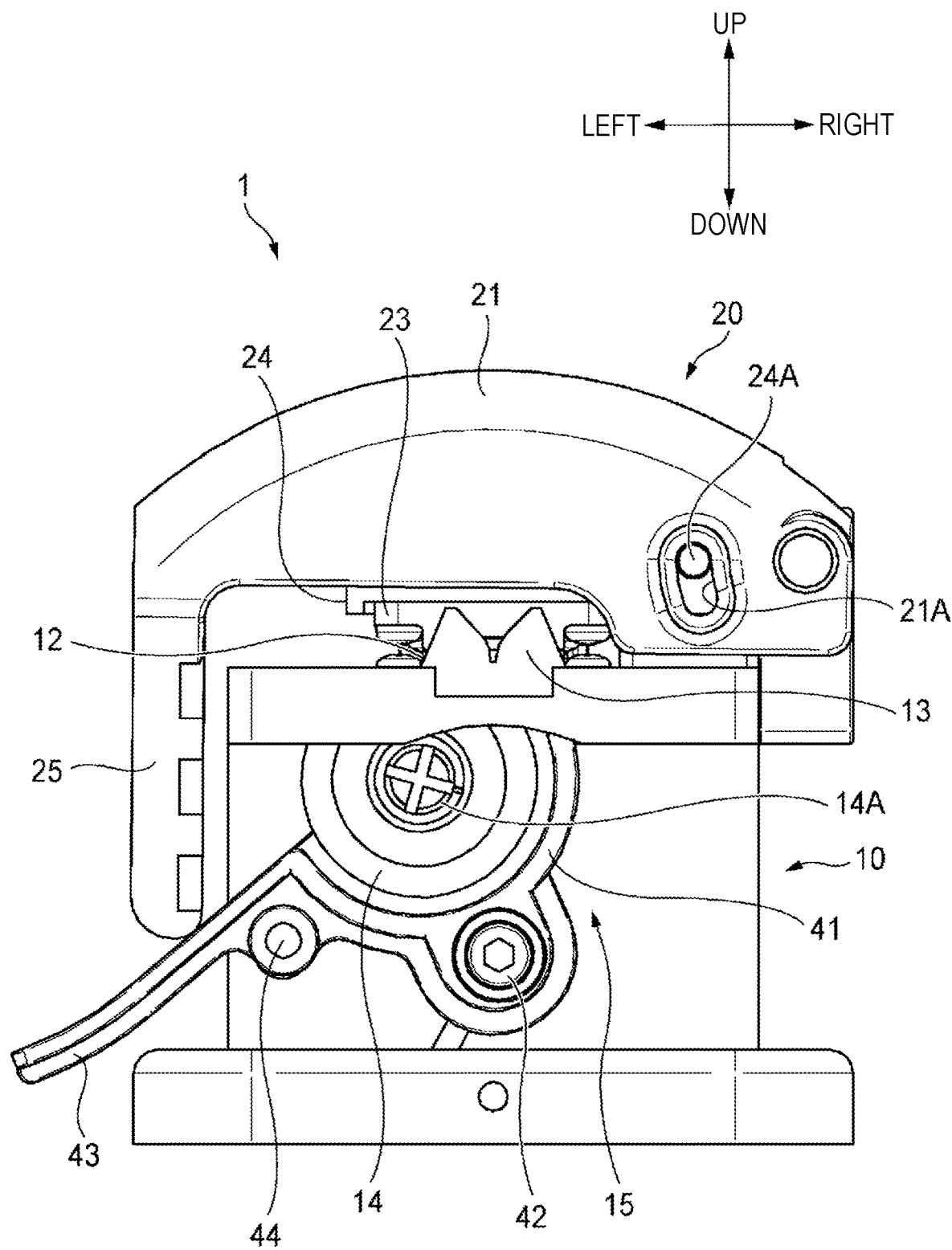
FIG. 6 is a front view showing the optical fiber cleaving apparatus in the state shown in FIG. 5.

Next, an example operation of the optical fiber cleaving apparatus 1 for cleaving the glass fiber portion of the optical fiber 100 with the optical fiber cleaving apparatus 1 will be described with reference to FIGS. 1 to 11. FIG. 5 is a front perspective view showing the optical fiber cleaving apparatus 1 with the clamp cover 20 closed, and FIG. 6 is a front view showing the state shown in FIG. 5. FIGS. 7 to 11 are views for explaining a movement of the retreat member 50 interlocked with a movement of the rotary lever 43.

First, as shown in FIGS. 1 to 3, with the main body 10 and the clamp cover 20 open, an operator stores the protective coating portion of the optical fiber 100, in which the glass fiber portion of a predetermined length is exposed at the tip, in the fiber storing groove 31 of the holder 30 attached to the holder fixing part 11. Then, the operator places the glass fiber portion of the optical fiber 100 on the lower clamp parts 12A and 12B, and stores the tip of the glass fiber portion in the guide groove 13A of the fiber positioning part 13.

Here, when the operator rotates the clamp cover 20 (arm member 21) from the open state toward the main body 10, as shown in FIGS. 5 and 6, the glass fiber portion of the optical fiber 100 is pinched and fixed by the lower clamp parts 12A and 12B and the upper clamp parts 23A and 23B facing each other.

Figure 7:
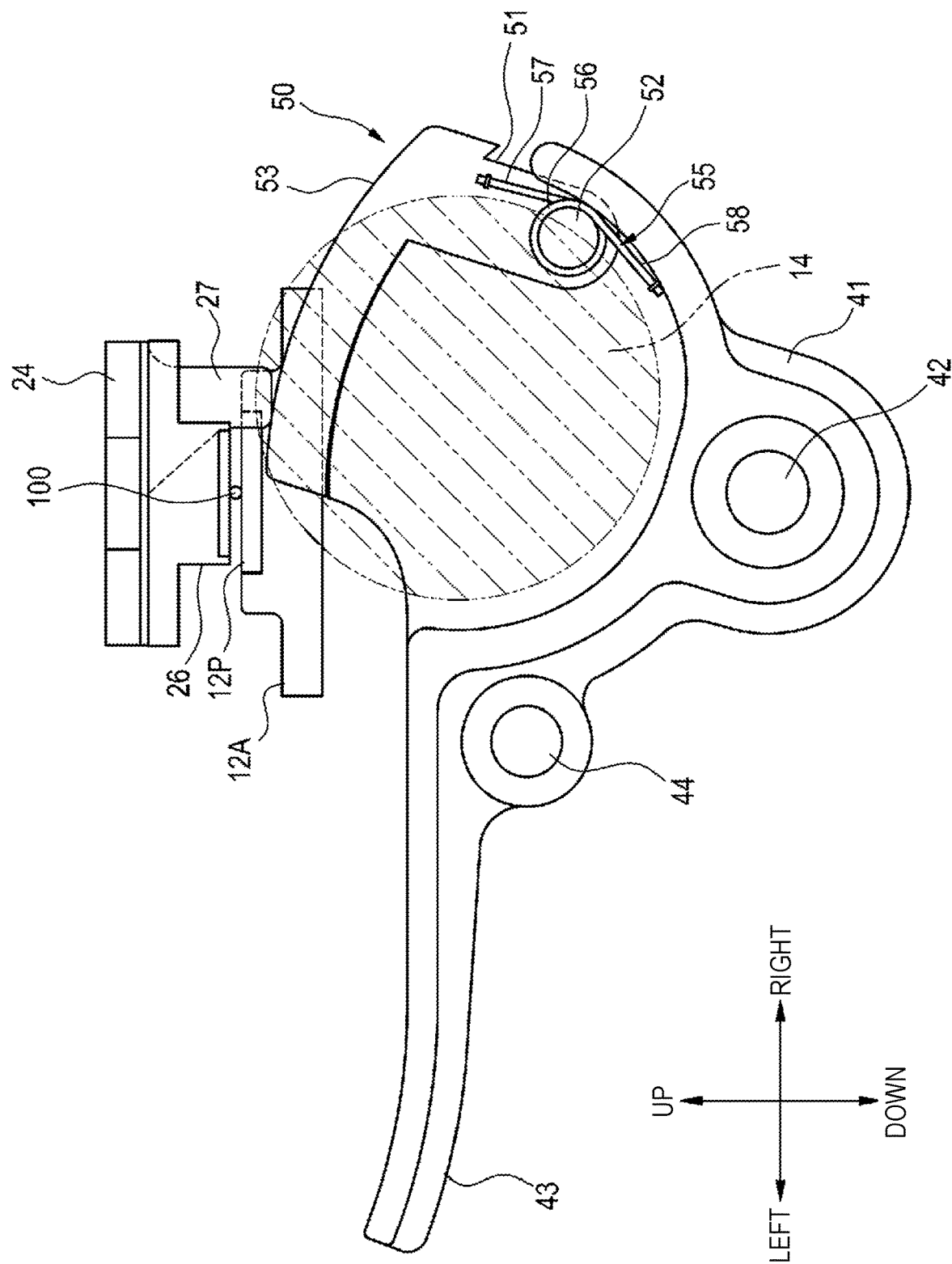
FIG. 7 is a view for explaining the movement of the retreat member interlocked with the movement of the rotary lever.

Here, as shown in FIG. 7, the arm 53 of the retreat member 50 is pressed by the protrusion part 27 of the mounting member 24 to be rotated about the rotating shaft 52 and moved downward against the urging force of the torsion spring 55. That is, with the optical fiber 100 being fixed by the upper and lower fixing members 12 and 23, the arm 53 is moved to a position where the arm 53 does not come into contact with the optical fiber 100. Specifically, the arm 53 is moved so that the upper surface thereof sinks inside the blade member 14 when viewed from the direction (front direction) of FIG. 4.

Then, when the lever pressing part 25 presses the rotary lever 43, the rotary lever 43 is moved downward. The glass fiber portion of the optical fiber 100 fixed between the upper and lower fixing members 12 and 23 is scratched by the blade member 14 that is moved along the circular arc about the rotary shaft 42 based on the downward movement of the rotary lever 43.

Figure 8:
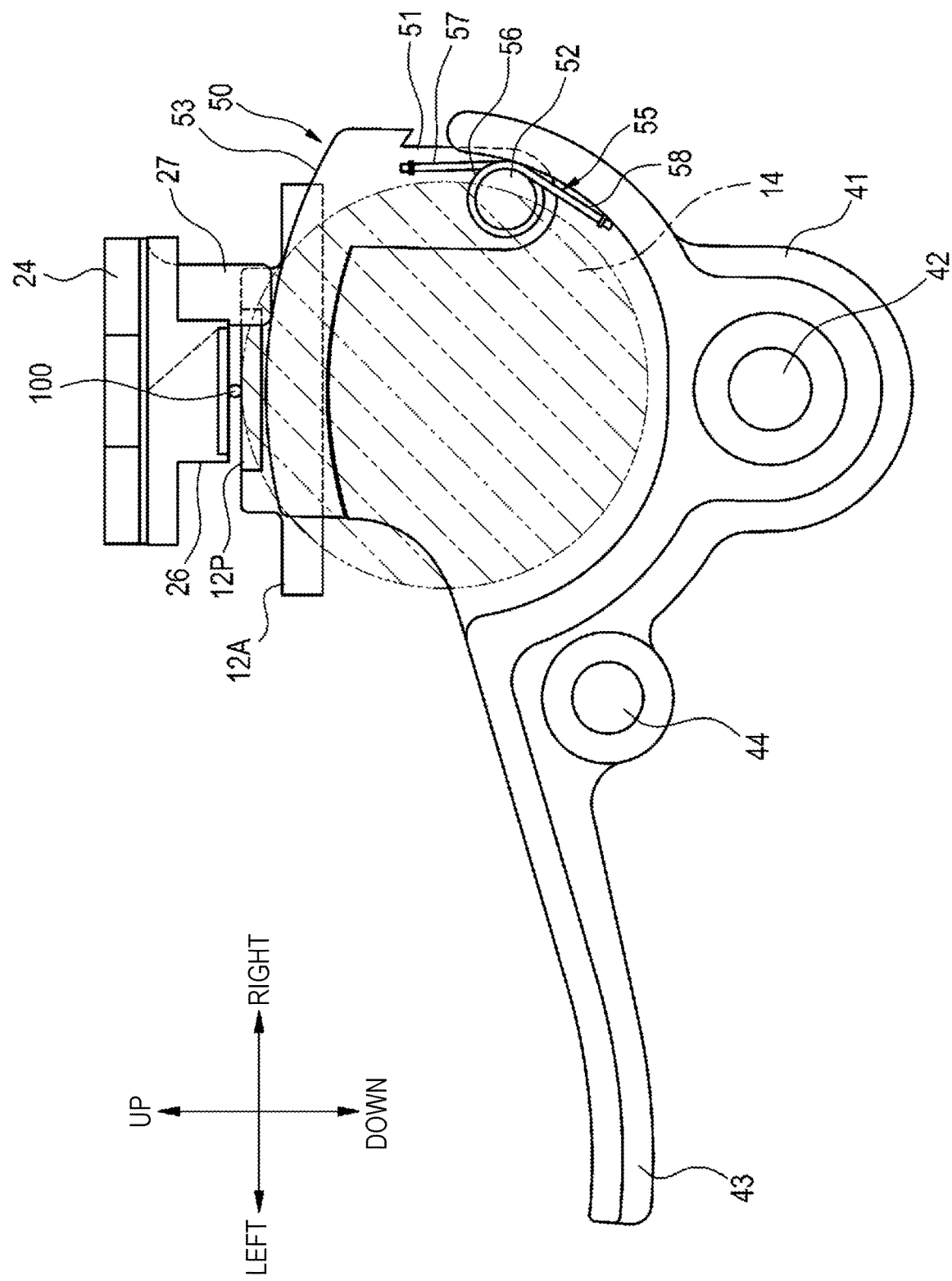
FIG. 8 is a view subsequent to FIG. 7, for explaining the movement of the retreat member interlocked with the movement of the rotary lever.

Here, as shown in FIG. 8, in response to the downward movement of the rotary lever 43, the arm 53 of the retreat member 50 is moved along the circular arc about the rotary shaft 42 likewise the blade member 14. In the state of FIG. 8, the arm 53 is pressed by the protrusion part 27, and the upper surface of the arm 53 remains sinking inside the blade member 14.

Figure 9:
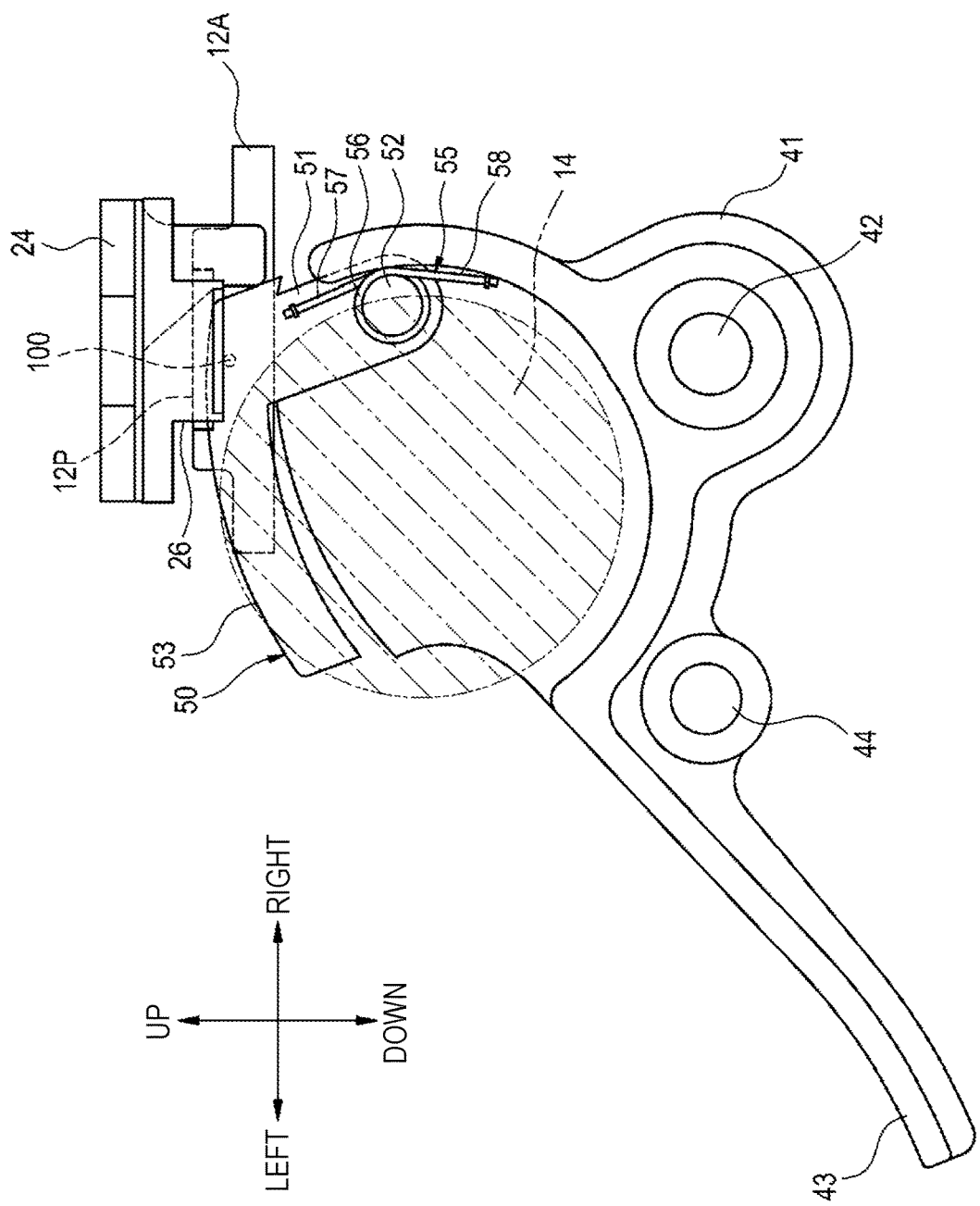
FIG. 9 is a view subsequent to FIG. 8, for explaining the movement of the retreat member interlocked with the movement of the rotary lever.

As shown in FIG. 9, when the rotary lever 43 is further moved downward, the protrusion part 27 is detached from the upper surface of the arm 53 and lowered along the right end of the arm 53. As the protrusion part 27 is lowered, the breaking member 26 is moved further downward and presses the scratched glass fiber portion. As a result, the scratch on the glass fiber portion is propagated and the glass fiber portion is broken.

When the cleaving work of the glass fiber portion is completed and the operator lets go of the arm member 21, the clamp cover 20 (the arm member 21 and the mounting member 24) is opened by the urging force of the spring member provided between the arm member 21 and the mounting member 24 (see FIG. 1, and the like).

Figure 10:
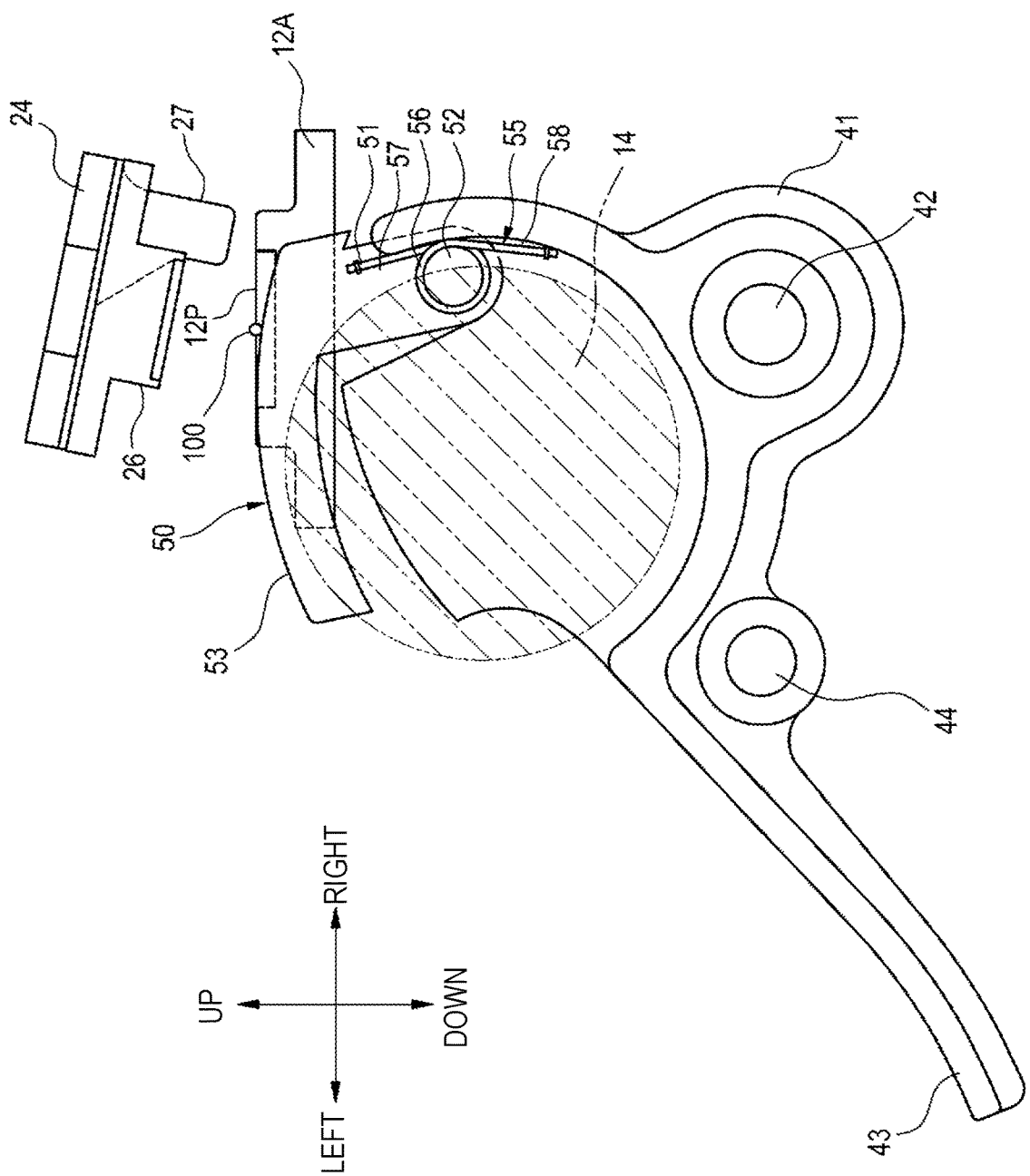
FIG. 10 is a view subsequent to FIG. 9, for explaining the movement of the retreat member interlocked with the movement of the rotary lever.

Here, as shown in FIG. 10, with the automatic opening of the clamp cover 20, the rotating shaft 52 of the retreat member 50 is also rotated in the clockwise direction due to the urging force of the torsion spring 55. As a result, the arm 53 of the retreat member 50, which was pressed downward by the protrusion part 27, is moved upward. The arm 53 moved upward as described above comes into contact with the optical fiber 100.

After that, the operator moves the rotary lever 43 or the round bar 44 of the holding member 15 upward, so that the holding member 15 holding the blade member 14 is moved to a standby position where the rotary lever 43 comes into contact with the top plate 10A. That is, the holding member 15 is returned to the initial state.

Figure 11:
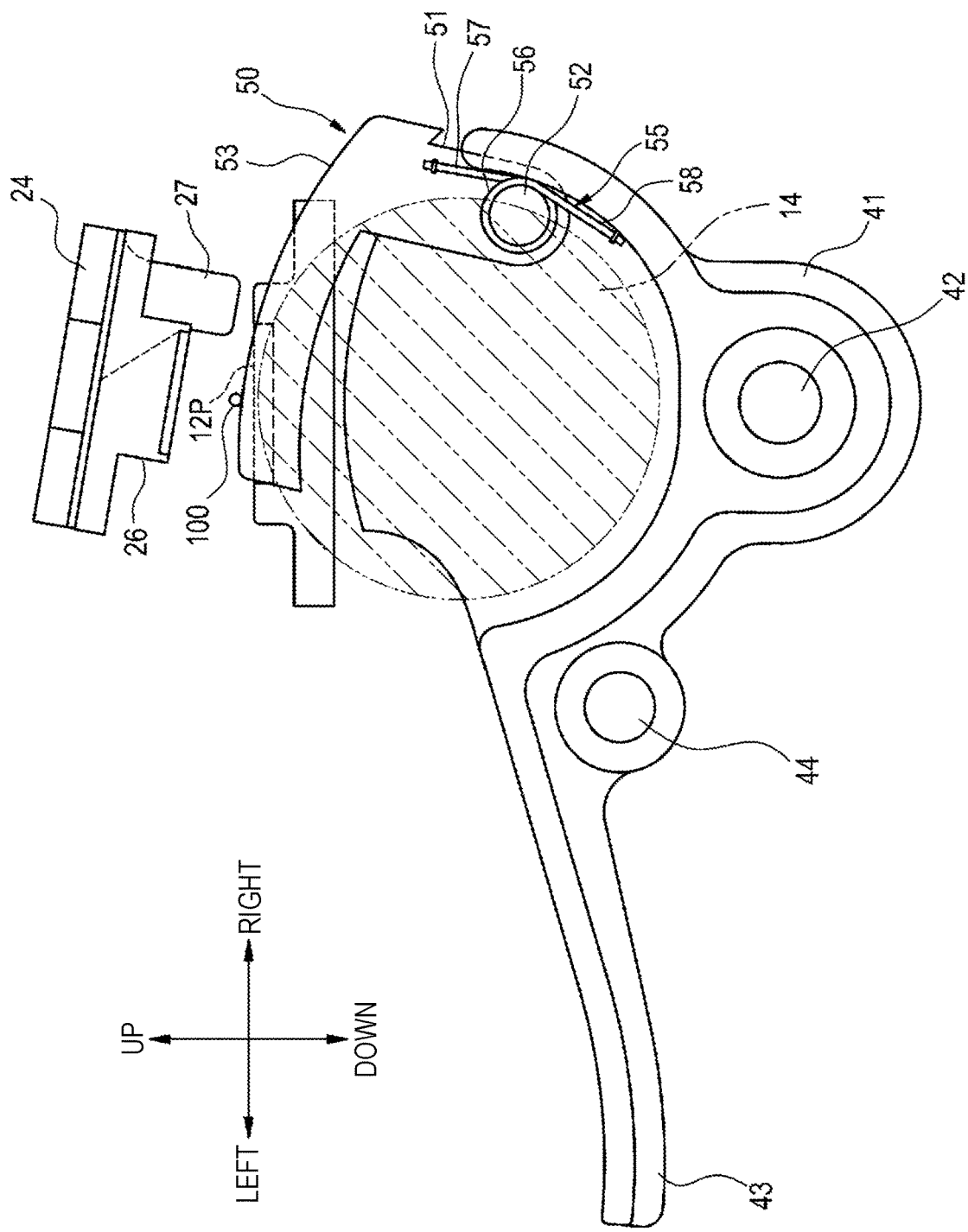
FIG. 11 is a view subsequent to FIG. 10, for explaining the movement of the retreat member interlocked with the movement of the rotary lever.

As shown in FIG. 11, as the holding member 15 is moved, the blade member 14 and the retreat member 50 are also returned to the standby position (initial state). Here, the upper surface of the arm 53 is urged by the urging force of the torsion spring 55 at a position protruding outward (upward) from the blade member 14 when viewed from the front direction. That is, the upper surface of the arm 53 protrudes upward from the apex of the moving path of the blade member 14. Therefore, the optical fiber 100 is moved further upward while sliding on the upper surface of the arm 53 of the retreat member 50 that is moved together with the blade member 14. As a result, the optical fiber 100 is moved to a position (specifically, a position above the apex of the moving path) that does not interfere with the moving path of the blade member 14 along the circular arc after cleaving of the optical fiber. That is, the broken end portion of the optical fiber 100 is moved by the retreat member 50 to a position that does not contact with the blade member 14.

As described above, the optical fiber cleaving apparatus 1 includes the main body 10 on which the optical fiber 100 is placed, in which the optical fiber 100 has a predetermined length of the glass fiber portion exposed at the tip, the cover member 20 which fixes the optical fiber 100 between the cover member 20 and the main body 10, the blade member 14 which scratches the glass fiber portion of the fixed optical fiber 100, and the breaking member 26 which breaks the glass fiber portion of the optical fiber 100 at the scratched portion. The optical fiber cleaving apparatus 1 further includes the holding member 15 which is movably attached to the main body 10 and which holds the blade member 14, and the retreat member 50 attached to the holding member 15. The retreat member 50 moves the broken end portion of the optical fiber 100 to a position that does not contact with the blade member 14. Specifically, the torsion spring 55 for urging the retreat member 50 is provided between the retreat member 50 and the holding member 15. Then, when pressed by the clamp cover 20, the retreat member 50 is moved to a position that does not contact with the optical fiber 100 fixed between the main body 10 and the clamp cover 20. That is, when the optical fiber 100 is fixed between the main body 10 and the clamp cover 20, the retreat member 50 is moved against the urging force of the torsion spring 55 to a position that does not contact with the optical fiber 100. When the retreat member 50 is urged by the torsion spring 55, the optical fiber 100, which is not fixed between the main body 10 and the clamp cover 20, is moved to a position that does not contact with the blade member 14. That is, when the optical fiber 100 is released from being fixed by the main body 10 and the clamp cover 20, the retreat member 50 is moved to a position where the blade member 14 and the optical fiber 100 do not come into contact with each other.

Accordingly, the retreat member 50 can be used to move the broken end portion of the optical fiber 100 to a position that does not contact with the blade member 14 after the optical fiber 100 is scratched. Therefore, it is possible to prevent the broken end portion (broken end surface or its vicinity) of the optical fiber 100 from being scratched after the optical fiber 100 is cleaved, with a simple configuration. When the blade member 14 scratches the optical fiber 100, the retreat member 50 is moved to a position that does not contact with the optical fiber 100 so that the retreat member 50 does not interfere with the movement of the blade member 14 during cleaving of the optical fiber. Accordingly, it is possible to smoothly cleave the optical fiber 100 and prevent unexpected scratching of the optical fiber 100 after cleaving.

The retreat member 50 moves the optical fiber 100 after cleaving by interlocking with the movement of the blade member 14. As a result, the retreat member 50 can be moved in a series of work steps from the completion of cleaving the optical fiber 100 to the start of cleaving the next optical fiber. Therefore, the cleaved optical fiber 100 after cleaving can be retreated from the blade member 14 without decreasing the work efficiency.

As described above, while the disclosure has been described in detail and with reference to specific embodiments thereof, it will be apparent to those skilled in the art that various changes and modifications can be made without departing from the spirit and scope of the disclosure. The number, the position, the shape, and the like of the above-described constituent members are not limited to the above embodiments, and can be changed to a suitable number, position, shape, and the like for implementing the present disclosure.

In the embodiment described above, it is configured such that the retreat member 50 is attached to the holding member 15, and the retreat member 50 is moved by interlocking with the movement of the blade member 14, but the present disclosure is not limited thereto. For example, it may be configured such that the retreat member is provided between the top plate 10A of the main body 10 and the holding member 15, and the retreat member is moved independently of the movement of the holding member 15 and the blade member 14. Here, for example, the retreat member may be disposed not to be exposed upward from the exposed hole 16 when the clamp cover 20 is open (initial state). Then, it is preferable that the retreat member protrudes upward from the exposed hole 16 according to the movement of the clamp cover 20 when the clamp cover 20 closed with respect to the main body 10 is opened again. Specifically, for example, the rotation of the rotary member 22 of the clamp cover 20 may be transmitted to the retreat member via an eccentric cam or the like to move the retreat member up and down. As a result, as in the embodiment described above, a configuration can be easily realized, in which the retreat member does not interfere with the movement of the blade member 14 when the blade member 14 scratches the optical fiber 100, and the optical fiber 100 can be retreated so that the optical fiber 100 does not come into contact with the blade member 14 after cleaving of the optical fiber 100.

In the embodiment described above, it is configured such that the blade member 14 is moved along the circular arc to scratch at least a part of the optical fiber 100, but the present disclosure is not limited thereto. For example, it may be configured such that the blade member is moved along a straight line (by linear motion) to scratch the optical fiber 100. In this case, the retreat member may be configured to move the broken end portion of the optical fiber 100 to a position that does not contact with the blade member while the blade member is moved along the straight line after the optical fiber 100 is scratched. As described above, by retreating the cleaved optical fiber 100 after cleaving to a position that does not contact with the blade member moved linearly by the retreat member, as in the embodiment described above, the broken end surface of the optical fiber 100 and its vicinity can be prevented from being scratched after the optical fiber 100 is cleaved.

In the embodiment described above, it is configured such that the retreat member 50 protrudes outside the blade member 14 in a state in which the optical fiber 100 is not fixed between the main body 10 and the clamp cover 20, so that the retreat member 50 retreats the optical fiber 100 to a position that does not contact with the blade member 14, but the present disclosure is not limited thereto. For example, a retreat member including a mechanism capable of moving the broken end portion of the optical fiber 100 by interlocking with the movement of the blade member 14 after cleaving of the optical fiber and moving the optical fiber 100 in a direction (for example, upward direction) intersecting the central axis in the longitudinal direction thereof, may be provided. Specifically, it is preferable that a mechanism for interlocking with the movement of the blade member 14 after cleaving of the optical fiber and tilting the holder 30 holding the optical fiber 100 is provided as the retreat member, for example. By providing such a retreat member, the broken end portion of the optical fiber 100 can be moved to a position that does not contact with the blade member 14.

For example, a retreat member including a mechanism capable of interlocking with the movement of the blade member 14 after cleaving of the optical fiber and moving the optical fiber 100 along the central axis in the longitudinal direction thereof, may be provided. Specifically, it is preferable that a mechanism for interlocking with the movement of the blade member 14 after cleaving of the optical fiber and slightly moving the holder 30 holding the optical fiber 100 in the rear direction as shown in FIG. 1 is provided as the retreat member, for example. By providing such a retreat member, the broken end portion of the optical fiber 100 can also be moved to a position that does not contact with the blade member 14. As described above, the retreat member can be realized in various configurations as long as the broken end portion of the optical fiber 100 can be moved to a position where the optical fiber 100 does not come into contact with the blade member 14 after the optical fiber is scratched.

In the embodiment described above, it is configured such that the torsion spring 55 provided between the retreat member 50 and the blade holding part 41 urges the rotating shaft 52 of the retreat member 50 in the clockwise direction, but the present disclosure is not limited thereto. It may be configured such that an urging member such as a compression spring or a leaf spring is provided between the retreat member 50 and the blade holding part 41, and the rotating shaft 52 of the retreat member 50 may be urged in the clockwise direction by the urging force of these urging members.

REFERENCE SIGNS LIST

1: optical fiber cleaving apparatus
10: main body
10A: top plate
10B: bottom plate
10C: pillar
11: holder fixing part
12: lower fixing member (an example of fixing member)
13: fiber positioning unit (an example of positioning unit)
14: blade member
15: holding member
16: exposed hole
20: clamp cover (an example of cover member)
21: arm member
21A: long hole
21B: notch
22: rotary member
23: upper fixing member
24: mounting member
25: lever pressing part
26: breaking member
30: holder
31: fiber storing groove
41: blade holding part
42: rotary shaft
43: rotary lever
44: round bar
50: retreat member
51: bearing
52: rotating shaft
53: arm
55: torsion spring
56: coil part
100: optical fiber

The invention claimed is:

1. An optical fiber cleaving apparatus, comprising:
a main body on which an optical fiber having a predetermined length of a glass fiber portion exposed at a tip is placed;
a cover member which fixes the optical fiber between the cover member and the main body to obtain a fixed glass fiber portion;
a blade member which scratches the fixed glass fiber portion;
a breaking member which breaks the glass fiber portion at the scratched portion;
a retreat member which moves a broken end portion of the optical fiber to a position that does not contact with the blade member;
a holding member that is movably attached to the main body and holds the blade member; and
an urging member for urging the retreat member,
wherein the retreat member is attached to the holding member,
wherein the urging member is provided between the retreat member and the holding member,
wherein the retreat member, when pressed by the cover member, is moved to a position that does not contact with the optical fiber fixed between the main body and the cover member, and
wherein the retreat member is urged by the urging member to move the optical fiber, which is not fixed between the main body and the cover member, to the position that does not contact with the blade member.

2. The optical fiber cleaving apparatus according to claim 1,
wherein the retreat member is interlocked with the movement of the blade member and moves the broken end portion.

3. The optical fiber cleaving apparatus according to claim 1,
wherein the retreat member is interlocked with the movement of the cover member and moves the broken end portion.

4. The optical fiber cleaving apparatus according to claim 1, wherein the blade member is moved along a circular arc.

5. The optical fiber cleaving apparatus according to claim 4, wherein the blade member is disposed to pass through at least a portion of a region where the glass fiber portion of the optical fiber is disposed, and wherein the retreat member moves the broken end portion to a position farther from a center of the circular arc than the region through which the blade member moved along the circular arc is passed.

6. The optical fiber cleaving apparatus according to claim 1, wherein the retreat member moves the optical fiber in a direction intersecting a central axis in a longitudinal direction thereof, to move the broken end portion to a position that does not contact with the blade member.

7. An optical fiber cleaving method, comprising:

fixing an optical fiber having a predetermined length of a glass fiber portion exposed at a tip to obtain a fixed glass fiber portion;

scratching the fixed glass fiber portion with a blade member;

breaking the glass fiber portion at the scratched portion; and moving a broken end portion of the optical fiber to a position that does not contact with the blade member, wherein in the fixing of the optical fiber, a retreat member is disposed at a position that does not contact with the optical fiber, wherein in the scratching of the fixed glass fiber portion, the retreat member is disposed at a position that does not contact with the optical fiber, and wherein in the moving of the broken end portion, the retreat member is moved to contact with the optical fiber and moves the broken end portion to a position that does not contact with the blade member.

\* \* \* \* \*